United States Patent [19]
Kikuchi et al.

[11] 3,762,145
[45] Oct. 2, 1973

[54] STRANDED METALLIC CORD FOR REINFORCING RUBBER ARTICLES

[75] Inventors: Michitsugu Kikuchi; Akishige Kasahara, both of Higashi-Murayama City, Tokyo; Takuji Fukuda, Kodaira City, Tokyo, all of Japan

[73] Assignee: Bridgestone Tire Company Limited, Tokyo, Japan

[22] Filed: Aug. 2, 1971

[21] Appl. No.: 168,151

[30] Foreign Application Priority Data
Aug. 10, 1970 Japan.............................. 45/78768

[52] U.S. Cl..................................... 57/145, 57/139
[51] Int. Cl. ......................... D02g 3/48, D07b 1/10
[58] Field of Search..................... 57/145, 148, 144, 57/139, 149

[56] References Cited
UNITED STATES PATENTS

| | | | |
|---|---|---|---|
| 3,555,789 | 1/1971 | Terragna.............................. | 57/145 |
| 3,413,799 | 12/1968 | Lejeune ................................ | 57/145 |
| 3,336,744 | 8/1967 | Peene ................................... | 57/145 |
| 2,277,145 | 3/1942 | Pierce................................... | 57/145 |

*Primary Examiner*—Donald E. Watkins
*Attorney*—Stevens, Davis, Miller & Mosher

[57] ABSTRACT

A stranded metallic cord for reinforcing rubber articles, comprising a core strand having a plurality of metallic filaments, and at least two peripheral strands, each consisting of a plurality of twisted metallic filaments, twisted about a core strand, with circumferential spacings. The metallic filaments in each of the core and peripheral strands are so disposed as to cause every filamnnt in the strand come to the periphery of the strand.

9 Claims, 9 Drawing Figures

STRANDED METALLIC CORD FOR REINFORCING RUBBER ARTICLES

This invention relates to a stranded metallic cord for reinforcing rubber articles, and more particularly to an improvement of stranding of multi-filament metallic cord for reinforcing rubber articles, such as tires for vehicles, conveyor belts, coated rubber tubes, and the like.

An object of the present invention is to provide an inexpensive stranded metallic cord having physical properties suitable for reinforcing rubber articles, such as high adhesive strength when bonded to rubber, and high reinforcing power without deteriorating the moldability of rubbeR. rubber.

For instance, a pneumatic tire is sometimes reinforced by metallic cords at its carcass, each of such metallic cords having a flexural rigidity which several thousand times of flexural rigidity of conventional organic fibers. The reinforcing metallic cords of tire carcass are folded at its bead portions by turning the cords by 180°, but the high flexural rigidity of the metallic cords provides a high resistance against such bending. Thus, it is not easy to produce desired deformation of such metallic reinforcing cords.

In order to mitigate such difficulty, it has been practised to make the reinforcing metallic cords by stranding a plurality of very thin or small-diameter metallic filaments. By using a large number of very thin or small-diameter metallic filaments, it is possible to reduce the elastic bend-recovery rate (as will be defined hereinafter) of the reinforcing metallic cords while ensuring the mechanical strength required for the reinforcement of the pneumatIc tire.

On the other hand, the reduction of the diameter of the metallic filament complicates the production of the reinforcing metallic cords and tends to reduce the productivity of such metallic cords. Accordingly, the cost of the metallic cords is likely to be increased by such diameter reduction.

Therefore, an object of the present invention is to obviate the aforesaid difficulties of the conventional reinforcing metallic cords, by providing an improved stranded metallic cord suitable for reinforcing rubber articles.

According to the present invention, there is provided a stranded metallic cord for reinforcing rubber articles, comprising a core strand extending along the longitudinal axis of the metallic cord, said core strand consisting of a plurality of metallic filaments of identical diameters, the metallic filaments in the core strand all reaching the outer periphery of the strand, and at least two peripheral strands being twisted about the core strand, the peripheral strands being spaced from each other in the circumferential direction of the cord, each of the peripheral strands consisting of a plurality of metallic filaments of identical diameters, all of the metallic filaments in each of the peripheral strands reaching the outer periphery of the peripheral strand to which the metallic filaments belong.

For a better understanding of the invention, reference is made to the accompanying drawings, in which.

Conventional metallic cords have a very stable construction, by closely winding peripheral strands about a cord strand, without providing any interstices between adjacent peripheral strands.

Figure 3A:
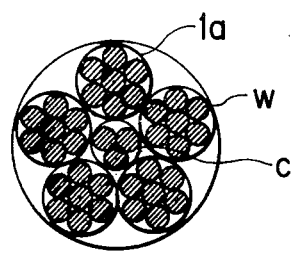
FIGS. 3A, 3B, 4A, and 4B are sectional views of conventional metallic cords.
Figure 3B:
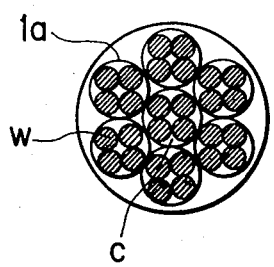

Referring to FIGS. 3A and 3B, several peripheral strands $1a$, e.g., five strands in FIG. 3A and six strands in FIG. 3B, are wound about a core strand $c$ in conventional stranded cords. The peripheral strands $1a$ in the conventional stranded cords are kept in tight contact with each other, for making the cords very stable. As a result, when the conventional metallic cords are embedded in a rubber article for purposes of reinforcement, it is difficult to sharply bend the metallic cords, for instance at the bead portions of a rubber tire. The high resistance to bending of the reinforcing metallic cords makes it difficult to produce uniform shape of rubber articles reinforced by such metallic cords.

Figure 4A:
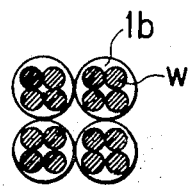
Figure 4B:
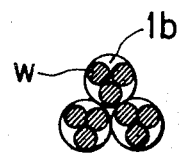

In other conventional metallic cords, core strand is eliminated, as shown in FIGS. 4A and 4B, for improving their flexibility. The constructions of FIGS. 4A and 4B, however, do not provide any circumferential interstices between adjacent strands, and hence, the bondage between the metallic cords and the rubber body being reinforced is rather weak. Accordingly, satisfactory reinforcing effects cannot be achieved.

In order to obviate such difficulties of conventional metallic cords for reinforcing rubber articles, the inventors have carried out a series of studies and tests, and succeeded in providing an improved stranded metallic cord comprising a core strand having no axial metal filament and at least two peripheral strands twisted about the core strand with circumferential spacings between adjacent peripheral strands, each of the peripheral strands having no axial metallic filament disposed therein. In other words, each of the strands in the stranded metallic cord according to the present invention comprises a plurality of metallic filaments, but all the metallic filaments in the strand comes to the peripheral surface of the strand, and there is no axial metallic filament in any strand which is completely surrounded by the remaining metallic filaments of the strand. Thus, the individual metallic filaments in each strand can easily move relative to each other when the stranded core is bent, so as to ensure a higher flexibility to the stranded cord. Furthermore, the interstices provided between adjacent peripheral strands of the cord according to the present invention ensures better bondage between the rubber material of the article being reinforced and the reinforcing stranded metallic cords, so as to improve the reinforcing effects. The circumferential interstices also improve the flexibility of the stranded cords embedded in a rubber article, because such interstices are filled with rubber material which allows a considerably large resilient deformation.

The material of the metallic filaments for making the strands in the cord of the present invention is preferably steel, e.g., stainless steel, but any other suitable material can also be used for making the filaments. For instance, copper or aluminum filaments may be used in the stranded metallic cords, according to the present invention.

Figure 1A:
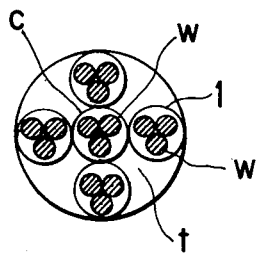
FIGS. 1A to 1D are lateral sectional views of different stranded metallic cords, according to the present invention.

FIGS. 1A to 1D illustrate four different embodiments of the stranded metallic cord, according to the present invention. Referring to FIG. 1A, a stranded metallic cord (1×3 + 4×3) according to the present invention comprises a core strand c consisting of three metallic filaments w of identical diameters which are twisted in one direction, and four peripheral strands 1 twisted about the cord strand c, preferably in the opposite direction of the twist of the steel filaments w in the core strand c. Preferably, each of the peripheral strands 1 has identical construction with the core strand c; namely, each peripheral strand 1 includes three metallic filaments w having the same diameter as that of the filament w of the core filaments and twisted in the same direction as the filaments of the core strand c. Such identical construction of all the strands, however, is not essential in the stranded metallic cord of the invention.

Figure 2:
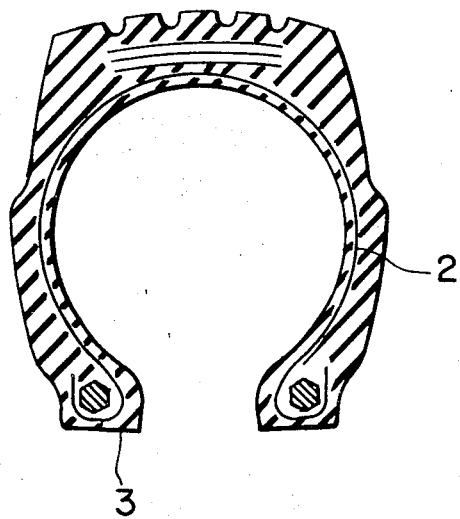
FIG. 2 is a radial sectional view of a pneumatic tire reinforced by the stranded metallic cords of FIG. 1.

It is apparent that none of the cord strand c and the peripheral strands 1 has an axial filament, so that each strand can easily deform itself upon bending. Furthermore, large circumferential interstices t are provided between adjacent peripheral strands 1, so that the peripheral strands 1 can easily be re-oriented for following any deformation of the stranded cord, such as at beads 3 of a carcass 2 in a pneumatic tire, as shown in FIG. 2. Thus, the stranded cord according to the present invention is very stable even after bending it at a large angle.

Figure 1B:
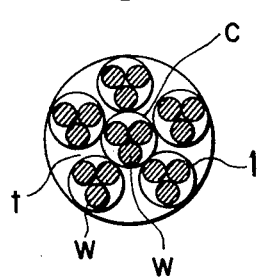

FIG. 1B illustrates another stranded metallic cord (1×3 + 5×3), which comprises a core strand c having three twisted metallic filaments w of identical diameters, and five peripheral strands 1 twisted about the core strand c in either the same or opposite direction to the twisting direction of the filaments w in the core strand c, while providing circumferential interstices t between adjacent peripheral strands 1. Each of the peripheral strands 1 also consists of three metallic filaments w.

Figure 1C:
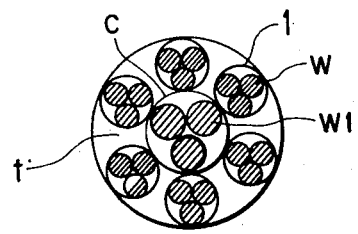

In the embodiment, as illustrated in FIG. 1C, diameter of metallic filaments constituting the core strand is different from that of filaments constituting peripheral strands 1. The stranded cord (1×3 + 6×3) of FIG. 1C comprises a core strand c consisting of three stranded large-diameter metallic filaments w1, and six peripheral strands 1 twisted about the core strand c with circumferential interstices t therebetween. Each of the peripheral strands 1 consists of three metallic filaments w of smaller diameters, as compared with the diameter of the filaments w1 of the core strand. The use of large-diameter filaments w1 in the core strand provides a large circumferential space around the core strand c for peripheral strand 1, so as to allow an increased interstice therebetween.

Figure 1D:
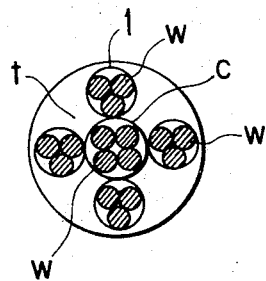

FIG. 1D shows another stranded cord(1×4 + 4×3), according to the present invention, in which a core strand c comprises four metallic filaments w of identical diameters, and four peripheral strands 1, each consisting of three metallic filaments w identical with those of the core strand, are twisted about the core strand c in either the same or opposite direction with the twisting direction of the metallic filaments w in the core strand c, while leaving circumferential interstices t between adjacent peripheral strands 1.

All the stranded metallic cords, as illustrated in FIGS. 1A to 1D, proved to have a high flexibility and deformability when embedded in a rubber article for reinforcement thereof. The stranded metallic cords according to the present invention also showed a high workability and a high bondage with rubber material. Furthermore, the stranded metallic cord of the present invention is inexpensive, because sizable interstices t are provided between adjacent peripheral strands.

As a result, the elastic resistivity of the stranded cord of the invention against deformation is greatly reduced. For instance, with the construction according to the present invention, it is possible to increase the size of the individual steel filament by 60 percent to 70 percent, as compared with the filaments of conventional stranded cords. Thus, highly stable tire beads can be formed by using the stranded cords according to the present invention.

In order to ensure suitable performance characteristics and efficient productivity of the stranded cords, the diameter of the steel filament w in the stranded cord according to the present invention should fall in a range of 0.20 mm to 0.30 mm.

The inventor has confirmed, by making test tires with the stranded cords of the present invention, that highly stable beads can be formed in the tire and that the stranded cords have satisfactory performance characteristics suitable for tire reinforcing cords.

The invention will now be described in further detail, by referring to example.

EXAMPLE

Five strands were prepared, each consisting of 3 steel filaments w of 0.26 mm dia. twisted in one direction. One of the strands was used as a core strand c, and the remaining four strands were twisted about the core strand c as peripheral strands 1, so as to produce stranded cord (5×3), according to the present invention, as shown in FIG. 1A. Various physical properties of the stranded steel cord thus prepared were measured.

For comparison's sake, the corresponding physical properties of two kinds of conventional stranded steel cords having similar gross cross sectional areas of the steel filaments to that of the aforesaid stranded steel cord according to the present invention were measured. One of the conventional stranded metallic cords comprised a core strand consisting of three twisted steel filaments, and five peripheral strands twisted about the core strand, each of the peripheral strands consisting of seven steel filaments (1×3 + 5×7). The steel filaments of the first conventional stranded cord had a diameter of 0.15 mm. The second one of the conventional stranded cords comprised a core strand consisting of four twisted steel filaments, and six peripheral strands twisted about the core strand, each of the peripheral strands consisting of four twisted steel filaments (1×4 + 6×4). Each steel filament in the second conventional stranded cord had a diameter of 0.18 mm.

The results are shown in the following Table.

TABLE

| Item | Cord of the invention (5×3) | Conventional cord No. 1 (1×4 + 6×4) | conventional cord No. 2 (1×3 + 5×7) |
|---|---|---|---|
| Cross sectional area (square millimeters) | 79.6 | 67.1 | 71.2 |
| Elongation at break[1] (%) | 2.10 | 2.59 | 2.33 |
| Adhesive strength I[2] (Kg) | 145 | 130 | 115 |
| Adhesive strength II[3] (Kg) | 10.4 | 7.4 | 5.1 |
| Bend-recovery rate[4] (%) | 70 | 90 | 100 |
| Processing cost, based on that for known stranded cords (%) | 87 | 100 | 100 |

Notes:
1. The elongation at break was calculated on the assumption that the cross section of the stranded cords were circular and had the indicated cross sectional area.
2. Each of the test rubber sheet specimens was 203.2 mm (8 inches) long, 50.8 mm (2 inches) wide, and 12.7 mm (one half inch) thick, and 15 steel filaments were embedded In the rubber sheet with intervals of 12.7 mm (one half inch) taken in the width direction of the specimen, and then each specimen was vulcanized.
The steel filaments were pulled one at a time at a speed of 200 mm/min, and the force at the moment when the steel filament was drawn out of the rubber sheet is indicated as the "Adhesive strength I".
3. Each of the test rubber sheet specimens was 22 cm long, 5 cm wide, and 4 mm thick, and 20 steel filaments were embedded in the rubber sheet at intervals of 2.5 mm taken in the direction of the length, and then each specimen was vulcanized. The surface rubber of each specimen was removed by a grinder, and three steel filaments were selected with one steel filament lying between the adjacent selected filaments, and the three steel filaments were grasped together and simultaneously pulled at a rate of 50 mm/min. The force at the moment when the steel filaments were drawn out of the specimen was measured and converted into a force per steel filament, and the force thus determined is indicated as the "Adhesive strength II".
4. (a.) The bend-recovery rate was determined as follows. A ring of 5 cm diameter was formed for each cord specimen. The ring was placed on a vertical plane and the lowermost point of the ring was fixed to a floor. The center of a disk having a 5 cm diameter was brought into contact with the uppermost point of the ring while keeping the disk horizontally.
The disk was depressed vertically, until the uppermost point of the ring was brought into contact with the fixed lowermost point thereof. Then, the disk was removed, and ring was left to stand for 5 minutes, at the end of the 5 minutes period, the height of the uppermost point of the recovering ring was measured and expressed in percent of the original height, i.e., 5 cm.
b. The small value of the bent-recovery rate means that the stranded cord can easily plastically deformed, for instance, in order to form tire bead portions of a tire carcass. Thus, the reduction of the bend-recovery rate indicates the improvement of the workability of the stranded cords and rubber articles reinforced by such stranded cords.

It should be noted in Table that the cross sectional area of the test specimen of the stranded cord according to the present invention is somewhat larger than that of the specimens of the conventional stranded cords. With such somewhat large cross sectional area, the bend-recovery rate of the specimen of the present invention proved to be better than that of the conventional stranded cords. If the specimens of the identical cross sectional areas should have been taken, the improvement of the bend-recovery rate of the present invention might have been proved to be greater than as shown in Table.

As shown in Table, the stranded cord according to the present invention has a better adhesive re-oriented to rubber and a smaller bend-recovery rate, as compared with those of the conventional stranded cords. The reason for such improvement seems to be in that the layout of the steel filaments in each strand and the interspaces between adjacent peripheral strands in the stranded cord of the present invention ensure stable movement of the individual steel filaments for stably assuming newly re-oreiented position. Especially, the interstices between adjacent peripheral strands provide for the firm bondage of rubber material to the metallic filaments and to the strands. Furthermore, the processing cost of the stranded metallic cord according to the present invention is less than the corresponding cost of conventional stranded metallic cords.

What is claimed is:

1. Stranded steel cord having a low bend-recovery rate for reinforcing rubber articles, comprising a core strand extending along the longitudinal axis of the steel cord, said core strand consisting of three steel filaments of identical diameters being twisted in one direction, and four peripheral strands being twisted about the core strand in the opposite direction to the twisting direction of the steel filaments in the core strand, each of the four peripheral strands consisting of three steel filaments having the same diameter as that of the filament in the core strand and being twisted in the same direction as those of the core strand.

2. Stranded metallic cord for reinforcing rubber articles, comprising a core strand extending along the longitudinal axis of the metallic cord, said core strand consisting of a plurality of metallic filaments of identical diameters, the metallic filaments in the core strand all reaching the outer periphery of the strand, and five peripheral strands being twisted about the core strand, the peripheral strands being spaced from each other in the circumferential direction of the cord, each of the peripheral strands consisting of a plurality of metallic filaments of identical diameters, all of the metallic filaments in each of the peripheral strands reaching the outer periphery of the peripheral strand to which the metallic filaments belong.

3. Stranded metallic core according to claim 2, wherein said core strand is twisted in one direction, and said peripheral strands are twisted about the core strand in the opposite direction to the twisting direction of the metallic filaments in the core strand, each of the peripheral strands is twisted in the same direction as those of the core strand.

4. Stranded metallic cord for reinforcing rubber articles, comprising a core strand extending along the longitudinal axis of the metallic cord, said core strand consisting of a plurality of metallic filaments of identical diameters, the metallic filaments in the core strand all reaching the outer periphery of the strand, and four peripheral strands being twisted about the core strand, the peripheral strands being spaced from each other in the circumferential direction of the cord, each of the peripheral strands consisting of a plurality of metallic filaments of identical diameters, all of the metallic filaments in each of the peripheral strands reaching the outer periphery of the peripheral strand to which the metallic filaments belong.

5. Stranded metallic cord according to claim 4, wherein said core strand consists of three metallic filaments of identical diameters and peripheral strands consist of three filaments of the same diameter as that of the metallic filament in the core strand.

6. Stranded metallic cord according to claim 4, wherein said core strand consists of four metallic filaments of identical diameters, and four peripheral strands are twisted about the core strand with circumferential spacings between adjacent peripheral strands, each of said peripheral strands consisting of three metallic filaments.

7. Stranded metallic cord for reinforcing rubber articles, comprising a core strand extending along the longitudinal axis of the metallic cord, said core strand consisting of three metallic filaments of identical diameters, the metallic filaments in the core strand all reaching the outer periphery of the strand, and at least two peripheral strands being twisted about the core strand, the peripheral strands being spaced from each other in the circumferential direction of the core, each of the peripheral strands consisting of a plurality of metallic filaments of a diameter smaller than the diameter of the metallic filament in the core strand, all of the metallic filaments in each of the peripheral strands reaching the outer periphery of the peripheral strand to which the metallic filaments belong.

8. Stranded metallic core according to claim 7, wherein said core strand consists of three metallic filaments each having a certain diameter, and at least six peripheral strands are twisted about the core strand with circumferential spacing therebetween, each of said peripheral strands consisting of three metallic filaments of a diameter smaller than the diameter of the metallic filament in the core strand.

9. Stranded metallic cord according to claim 7, wherein said core strand is twisted in one direction, and said peripheral strands are twisted about the core strand in the opposite direction to the twisting direction of the metallic filaments in the core strand, each of the peripheral strands is twisted in the same direction as those of the core strand.

* * * * *